United States Patent Office
3,631,005
Patented Dec. 28, 1971

3,631,005
N,N'-BIS(ISOMALEIMIDE) POLYHYDRAZIDES
You-Ling Fan, East Brunswick, N.J., assignor to Union
Carbide Corporation, New York, N.Y.
No Drawing. Filed Jan. 29, 1969, Ser. No. 795,075
Int. Cl. C08g 20/20
U.S. Cl. 260—78 UA        3 Claims

ABSTRACT OF THE DISCLOSURE

High molecular weight polyhydrazides have been prepared successfully by allowing equimolar amounts of N,N'-bis(isomaleimide) and dihydrazides to react in a highly polar solvent at room temperature. Both aliphatic and aromatic polyhydrazides are amorphous resins with glass transition temperatures about 100° C. They exhibit excellent oxygen barrier properties, very high dielectric constants and fairly good mechanical properties.

---

This invention relates to the preparation of N,N'-bis-(isomaleimide) polyhydrazides and more particularly to copolymers of N,N'-bis(isomaleimide) and dihydrazides and copolymers of N,N'-bis(isomaleimide), dihydrazides and diacyl halides.

These polyhydrazides have repeating units represented by the formula:

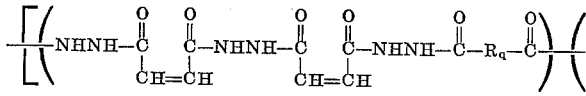

wherein each of R, R' and R" is a divalent hydrocarbon radical selected from the group consisting of alkylene radicals having 1 to about 18 carbon atoms and arylene radicals having 6 to about 10 carbon atoms, each of $q$ and $r$ is an integer having a value of 0 to 1, and $n$ is an integer denoting the degree of polymerization and is sufficiently large so as to afford a normally solid polymer.

Where R is alkylene the preferred dihydrazide is that derived from sebacic acid although those derived from other aliphatic dibasic acids such as oxalic, malonic succinic, glutaric, adipic, pimelic, suberic, azelaic, dodecanoic, octadecanoic acids and the like can be used if desired.

Where R is arylene the preferred dihydrazides are those derived from mononuclear aromatic dibasic acids such as terephthalic, isophthalic, and phthalic acids although polynuclear aromatic dibasic acids can be used if desired.

One of the classes of N,N'-bis(isomaleimide) polyhydrazides of this invention are normally solid, linear, high polymers obtained by the condensation polymerization of equimolar amounts of N,N'-bis(isomaleimide and dihydrazides in polar solvents. Schematically this may be indicated by the equation:

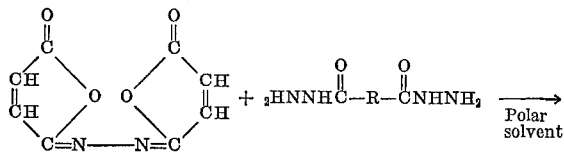

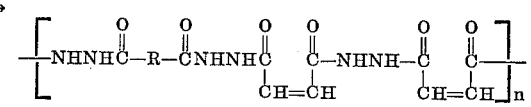

where R and $n$ are as defined above.

Suitable polar solvents which can be used in this class of polymerizations include dimethyl sulfoxide, hexamethyl phosphoamide, dimethyl formamide, dimethyl acetamide and the like. Temperature and time are not narrowly critical although temperatures of about 0 to 80° C. and polymerization times of about 4 to 70 hours are preferred.

Another class of N,N'-bis(isomaleimide) polyhydrazides of this invention are normally solid, linear high polymers obtained by the low temperature solution condensation polymerization of N,N'-bis(isomaleimide)dihydrazide adducts and a diacyl chloride. The adducts are prepared from 1 mole of N,N'-bis(isomaleimide) and 2 moles of a dihydrazide as delineated below:

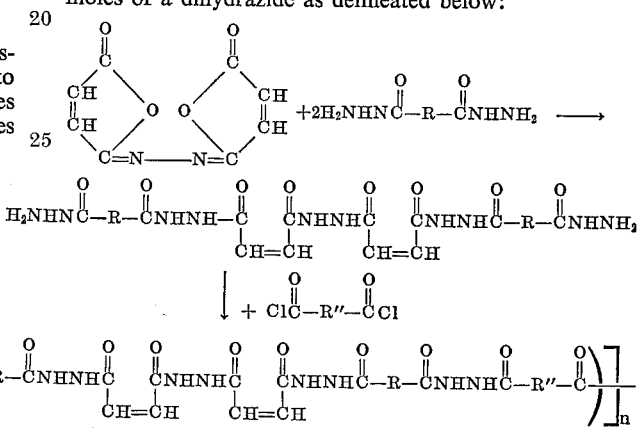

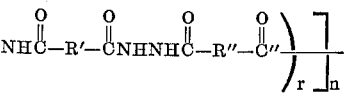

where R, R" and $n$ are as defined above.

The preferred solvent system used to carry out this class of polymerizations is N,N'-dimethyl acetamide containing lithium chloride. An amount of lithium chloride was used which affords a 2:1 molar ratio with the diacyl chloride. Although lower molecular weight polyhydrazides are obtained, lithium chloride can be replaced by aliphatic amines such as triethylene diamine or triisopropyl amine or an aromatic amine such as pyridine. Other conditions preferred for this class of polymerizations include polymerization temperatures of about −20 to 0° C. and polymerization times of about 1–3 hours although longer as well as shorter periods can be used if desired.

Conventional polymerization equipment known in the art can be used for these polymerizations.

Atmospheric pressures are preferred although superatmospheric as well as subatmospheric pressures can be used if desired.

The polyhydrazides of this invention can be described generally as rigid amorphous solids capable of being cast into useful films or drawn into useful fibers. Their physical and mechanical properties fall in a range suitable for structural or formed articles, self supporting films and the like. These polyhydrazides also exhibit useful electrical properties and stability to ultraviolet radiation.

The invention is further described by the examples which follow. All parts and percentages are by weight unless otherwise specified.

EXAMPLES 1-8

Hydrazide syntheses

The general synthesis of the dihydrazides used in this invention is described below.

A three-necked, two liter round bottom flask equipped with a stirrer, addition funnel, condenser and thermometer was charged with 175 g. (3.5 moles) of hydrazine hydrate and one liter of methanol. A solution of 0.5 mole of the dimethyl ester of one of the dibasic acids enumerated below in 250 ml. of methanol was added to the reaction flask through the addition funnel dropwise at a rate of about 1 to 10 drops per second. Some of the esters afforded a solution, while others having limited solubility in methanol required that the reaction mixture be refluxed to effect solution. In either case once a homogeneous mixture was attained, it was allowed to stand overnight at ambient temperatures without stirring. The solid which precipitated out was removed by filtration, washed with methanol on the filter and dried in a vacuum oven at about 70° C. The resultant dihydrazides can be recrystallized from methanol-water. Acids subjected to this method include, oxalic, malonic, succinic, adipic, sebacic, terephthalic, isophthalic, phthalic acids. Yields, melting points, and temperatures of the hydrazides prepared are presented in Table I.

TABLE I.—DIHYDRAZIDES

| Example No. | Formula of product $H_2NNHC(O)-X-C(O)HNH_2$ where X is: | Conditions of Preparation T., °C. Time, hr. | Yield, percent | M.P., °C. obs. |
|---|---|---|---|---|
| 1 | $-(CH_2)_0-$ | R.T.,[a] overnight). | 99 | 241-242 |
| 2 | $-(CH_2)-$ | do | 90 | 155-157 |
| 3 | $-(CH_2)_2-$ | do | 90 | 168-169 |
| 4 | $-(CH_2)_4-$ | Reflux (½) | 98 | 176 |
| 5 | $-(CH_2)_8-$ | do | 92 | 179 |
| 6 | 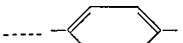 | R.T. (overnight) | 99 | >300 |
| 7 | 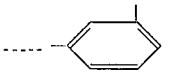 | do | 99 | 224-225 |
| 8 |  | do | 24 | >300 |

[a] R.T. is room temperature.

EXAMPLE 9

2 Copolymerization of dihydrazides and N,N'-bis(isomaleimide)

The general method for the copolymerizations of N,N'-bis(isomaleimide) and polyhydrazides was as follows:

A three-necked, 100 ml. flask equipped with a stirrer, thermometer and nitrogen inlet tube was charged with a solution of 0.01 mole of one of the dihydrazides prepared in Examples 1-8 in 50 ml. of dry dimethyl sulfoxide. Then 0.01 mole of N,N'-bis(isomaleimide) was added under nitrogen with stirring. The reaction mixture showed a small exotherm. Stirring was continued overnight. The product N,N'-bis(isomaleimide) polyhydrazide was isolated by pouring the reaction mixture into an excess of water or acetone-ether mixture, filtering the precipitated polyhydrazide, and washing with either water or an acetone-ether mixture. The polyhydrazide was dried in a vacuum oven at 70° C.

TABLE II.—SOLUTION POLYMERIZATION OF N,N'-BIS(ISOMALEIMIDE) AND DIHYDRAZIDES

| Example | R in the dihydrazide $H_2NHNC(O)-R-C(O)NHNH_2$ | Solvent | Temp., °C. | Time, hr. | Catalyst | Yield, percent | R.V.[1] | Temp.[2] °C. (about) | Characteristics of polymer |
|---|---|---|---|---|---|---|---|---|---|
| 9 | $-(CH_2)_0-$ | DMSO [3] | 45 | 50 | / | 95 | 0.13 | 155 | Greenish yellow solid. |
| 10 | $-(CH_2)-$ | DMSO [3] | 10-R.T. | 21 | / | >99 | 0.2 | 140-180 | Do. |
| 11 | $-(CH_2)-$ | DMSO [3] | R.T. | 17 | / | >99 | 0.29 | 140-180 | Do. |
| 12 | $-(CH_2)-$ | DMSO [3] | 65-70 | 17 | / | 99 | 0.22 | 140-180 | Do. |
| 13 | $-(CH_2)-$ | DMSO [3] | 80 | 22 | / | 84 | 0.15 | 140-180 | Do. |
| 14 | $-(CH_2)-$ | DMSO/pyridine=1/1 | -5-R.T. | 17 | Pyridine | >99 | 0.16 | 140-180 | Yellow solid. |
| 15 | $-(CH)_2-$ | DMSO | R.T. | 70 | do | >99 | 0.12 | 140-180 | Greenish yellow solid. |
| 16 | $-(CH_2)-$ | DMSO | R.T. | 70 | 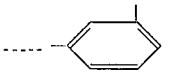 | >99 | 0.09 | 140-180 | Do. |
| 17 | $-(CH_2)_2-$ | DMSO | R.T. | 22 | / | >99 | 0.27 | 206 | Do. |
| 18 | $-(CH_2)_4-$ | DMSO | R.T. | 22 | / | 99 | 0.23 | 220 | Do. |
| 19 | $-(CH_2)_4-$ | DMSO | 40 | 68 | / | 90 | 0.25 | 220 | Do. |
| 20 | $-(CH_2)_8-$ | DMSO | R.T. | 18 | / | 95 | 0.58 | 230 | Do. |
| 21 | $-(CH_2)_8-$ | HMPA [4] | 0- | 18 | / | 85 | 0.36 | 230 | Yellow solid. |
| 22 |  | DMSO | R.T. | 23 | / | 95 | 0.10 | 245 | Greenish yellow solid. |
| 23 | 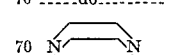 | DMSO | R.T. | 19 | / | 94 | 0.30 | 230 | Do. |
| 24 |  | HMPA | 0-5 | 4 | / | >99 | 0.15 | 230 | Do. |
| 25 |  | DMAA [5] | -25- | 14 | / | >99 | 0.14 | 230 | Do. |
| 26 |  | DMSO | R.T. | 65 | / | 56 | 0.05 | 218 | Yellow solid. |

[1] Measured in dimethyl sulfoxide (Conc. 0.2 g./dl.) at 25° C.
[2] Sample began to shrink, darken and decompose gradually.
[3] Dimethyl sulfozide.
[4] Hexamethyl phosphoamide.
[5] Dimethyl acetamide.

The polyhydrazides prepared are listed in Table II together with pertinent physical data and the polymerization conditions used.

EXAMPLES 27-36

Low temperature solution polymerization

The general procedure used for low temperature solution polymerization of N,N'-bis(isomaleimide) dihydrazide adducts with a diacyl chloride was as follows:

A three-necked 100 ml. flask, equipped with a mechanical stirrer, nitrogen inlet tube, drying tube, and thermometer was charged with 0.96 g. (0.005 mole) of N,N'-bis (isomaleimide), 0.01 mole of a dihydrazide and 20 ml. of N,N'-dimethylacetamide. This mixture was stirred at room temperature or with gentle heating, if required, until a homogeneous solution was obtained. This solution was then cooled to a temperature of about 0° to —20° C. and 0.43 g. (0.01 mole) of finely divided lithium chloride particles added with vigorous stirring so that a uniform suspension was formed. A solution of 0.005 mole of a diacyl chloride in 5 ml. of N,N'-dimethylacetamide precooled to about 0 to —50° C. was then introduced into the flask by means of a hypodermic syringe. An exothermic reaction occurred immediately accompanied by a rapid increase in the viscosity of the reaction mixture. The resultant polymer was isolated by pouring the reaction mixture into either water or and acetonediethyl ether mixture (1:1), filtration and washing with water in a Waring blendor. The polymer was then recovered and dried in a vacuum oven at about 70° C.

The series of polyhydrazides thus prepared are delineated in Table III showing the reactants used, polymerization conditions, yields and some physical data.

TABLE IV

| Example | 20 | 35 |
|---|---|---|
| Tensile modulus (p.s.i.) | 340,000 | 340,000 |
| Tensile strength (p.s.i.) | 4,600 | 6,000 |
| Elongation (percent) | 5 | 1-7 |
| Impact strength (ft. lbs./in.$^3$) | 30 | |
| Tg. (° C.) | [1] 100 | [1] 170 |
| Oxygen permeability (cc./mil/100 in.$^2$/24 hr./atm.) (measured at standard temperature and pressure) | 4.4 | 2.5 |
| Water absorption (wt. percent) | | 21 |
| Volume resistivity (ohm-cm.) | 1.47×10$^{13}$ | |
| Dielectric constant: | | |
| 60 cycles | 6.7 | |
| 1×10$^3$ cycles | 6.49 | |
| 1×10$^6$ cycles | 5.50 | |
| Dissipation factor: | | |
| 60 cycles | 0.0325 | |
| 1×10$^3$ cycles | 0.0228 | |
| 1×10$^6$ cycles | 0.0409 | |

[1] About.

Although the invention has been described in its preferred form with a certain amount of particularity, it is understood that the present disclosure has been made only by way of example, and that numerous changes can be made without departing from the spirit and scope of the invention.

What is claimed is:

1. Normally solid N,N'-bis(isomaleimide) polyhydrazides consisting of units represented by the formula:

$$\left[\left(-NHNH\overset{O}{\overset{\|}{C}}-R-\overset{O}{\overset{\|}{C}}NHNH\overset{O}{\overset{\|}{C}}\phantom{X}\overset{O}{\overset{\|}{C}}NHN H\overset{O}{\overset{\|}{C}}\phantom{X}\overset{O}{\overset{\|}{C}}NHNH\overset{O}{\overset{\|}{C}}-\right.\right.$$
$$\underset{CH=CH}{\phantom{X}} \phantom{XXX} \underset{CH=CH}{\phantom{X}}$$
$$\left.\left. R-\overset{O}{\overset{\|}{C}}-NHNH\overset{O}{\overset{\|}{C}}-R'-\overset{O}{\overset{\|}{C}}\right)\right]-$$

TABLE III.—LOW TEMPERATURE SOLUTION POLYMERIZATION OF THE N,N'BIS(ISOMALEIMIDE)-DIHYDRAZINE ADDUCTS AND DIACYL CHLORIDE

| Example | X in the dihydrazide HNH$\overset{O}{\overset{\|}{C}}$—X—$\overset{O}{\overset{\|}{C}}$NHNH | Y in the diacyl chloride Cl$\overset{O}{\overset{\|}{C}}$Y$\overset{O}{\overset{\|}{C}}$Cl | Solvent | Temp., °C. | Time, hr. | Yield, percent | R.V [b] | Time,[d] °C. (about) | Characteristics of polymer |
|---|---|---|---|---|---|---|---|---|---|
| 27 | —(CH$_2$)$_4$— | —(CH$_2$)$_8$— | DMAA, LiCl [a] | —5—-12 | 2 | 61 | Insol. | 220 | Yellow solid. |
| 28 | —(CH$_2$)$_8$— | —(CH$_2$)$_8$— | DMAA, LiCl [a] | —5—-10 | 1 | 80 | Insol. | 245 | Greenish yellow solid. |
| 29 | —(CH$_2$)$_8$— | —(CH$_2$)$_8$— | DMAA | —5—-10 | 1 | 93 | Insol. | 245 | Do. |
| 30 | —(CH$_2$)$_8$— | —(CH$_2$)$_8$— | HMPA | 0 | 3 | 93 | Insol. | 245 | Greenish white solid. |
| 31 | phenylene | phenylene | DMAA, LiCl [a] | —10 | 2½ | 90 | 0.57 | 225 | Greenish yellow solid. |
| 32 | phenylene | phenylene | DMAA, triisopropylamine. | —20 | 1⅓ | [c] 99 | 0.22 | 225 | Do. |
| 33 | phenylene | phenylene | DMAA, triethyleneamine. | —20 | 1⅓ | [c] 94 | 0.19 | 225 | Do. |
| 34 | phenylene | phenylene | DMAA, pyridine | —20 | 1⅓ | [c] 91 | 0.17 | 225 | Do. |
| 35 | phenylene | phenylene | ....do.... | —12 | 3 | 90 | 0.36 | 280 | Do. |
| 36 | phenylene | phenylene | ....do.... | —5 | 3 | [c] 85 | 0.39 | 280 | Do. |

[a] The medium contains equal molar amount of LiCl as that of the acyl chloride group.
[b] Measured in dimethyl sulfoxide solution (Conc. 0.2 g./dl.) at 25° C.
[c] Sodium bicarbonate was added to neutralize the HCl during coagulation.
[d] Polymer began to shrink, darken and decompose gradually. Dimethyl acetamide hexamethyl phosphoamide.

In order to demonstrate the areas of utility of the polyhydrazides of this invention further, physical property data as well as electrical and mechanical property data are presented in Table IV.

wherein each of R and R' is a phenylene radical.

2. Polyhydrazide claimed in claim 1 wherein each of R and R' is

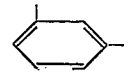

3. Polyhydrazide claimed in claim 1 wherein R is
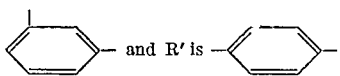
and R' is
References Cited
UNITED STATES PATENTS
| | | | |
|---|---|---|---|
| 3,041,376 | 6/1962 | Sauers | 260—562 |
| 3,144,435 | 8/1964 | Sauers | 260—78 |
| 3,472,817 | 10/1969 | Hedaya | 260—78 |
JOSEPH L. SCHOFER, Primary Examiner
C. A. HENDERSON, JR., Assistant Examiner
U.S. Cl. X.R.
117—161; 260—30.6 R, 30.8 DS, 32.6 N, 558 H, 561 H